United States Patent
Amin et al.

(10) Patent No.: US 12,330,986 B1
(45) Date of Patent: Jun. 17, 2025

(54) EFFICIENT METHODS OF GRINDING VOLCANIC PUMICE AND ITS USE IN MAKING CEMENTITIOUS COMPOSITES

(71) Applicant: KING FAISAL UNIVERSITY, Al-Ahsa (SA)

(72) Inventors: Muhammad Nasir Amin, Al-Ahsa (SA); Kaffayatullah Khan, Al-Ahsa (SA); Majdi Adel Al-Faiad, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/534,523

(22) Filed: Dec. 8, 2023

(51) Int. Cl.
| | |
|---|---|
| C04B 14/16 | (2006.01) |
| C04B 7/02 | (2006.01) |
| C04B 20/02 | (2006.01) |
| C04B 28/04 | (2006.01) |

(52) U.S. Cl.
CPC ............ C04B 14/16 (2013.01); C04B 7/02 (2013.01); C04B 20/026 (2013.01); C04B 28/04 (2013.01); *C04B 2201/52* (2013.01)

(58) Field of Classification Search
CPC ......... C04B 14/16; C04B 7/02; C04B 20/026; C04B 28/04; C04B 2201/52; C04B 14/14; C04B 7/12; C04B 20/00; C04B 28/00; C04B 2201/00
See application file for complete search history.

(56) References Cited

U.S. PATENT DOCUMENTS

| | | | |
|---|---|---|---|
| 2010/0282466 A1* | 11/2010 | Brenneis | C04B 28/021 106/707 |
| 2012/0227631 A1* | 9/2012 | Roddy | C09K 8/467 507/140 |
| 2017/0002257 A1* | 1/2017 | Pisklak | C04B 28/34 |

OTHER PUBLICATIONS

Zeyad, Abdullah M., and Ali Almalki. "Role of particle size of natural pozzolanic materials of volcanic pumice: flow properties, strength, and permeability." Arabian Journal of Geosciences 14 (2021): 1-11.
Aruna, S. T., et al. "Cost-effective wear and oxidation resistant electrodeposited Ni—pumice coating." Surface and Coatings Technology 251 (2014): 201-209.
Ahmedai, Mutasim A., et al. "Characterization of Jebal Meidoub Volcanic Ash and Pumice as Cement Replacing Materials for Use in Blended Cements." Conference Proceedings Civil Engineering 2018. 2018.
Hossain, Khandaker M. Anwar. "Properties of volcanic pumice based cement and lightweight concrete." Cement and concrete research 34.2 (2004): 283-291.
Zeyad, Abdullah M., et al. "Production of geopolymer concrete by utilizing volcanic pumice dust." Case Studies in Construction Materials 16 (2022): e00802.
Hossain, Khandaker M. Anwar. "Potential use of volcanic pumice as a construction material." Journal of materials in civil engineering 16.6 (2004): 573-577.
Onoue, Kozo, Hiroki Tamai, and Hendro Suseno. "Shock-absorbing capability of lightweight concrete utilizing volcanic pumice aggregate." Construction and Building Materials 83 (2015): 261-274.
Parhizkar, T., Meysam Najimi, and Ali Reza Pourkhorshidi. "Application of pumice aggregate in structural lightweight concrete." (2012): 43-54.

* cited by examiner

*Primary Examiner* — Amber R Orlando
*Assistant Examiner* — Marites A Guino-O Uzzle
(74) *Attorney, Agent, or Firm* — Nath, Goldberg & Meyer; Joshua B. Goldberg

(57) ABSTRACT

A cement composition is provided including a cementitious matrix containing Portland cement and a volcanic pumice component incorporated within the cementitious matrix. The volcanic pumice component is prepared by grinding in a ball mill using tungsten balls. The ball mill uses a tungsten carbide bowl of capacity 250 ml and the 12 tungsten carbide balls each having a diameter of about 20 mm. The volcanic pumice component is prepared in the ball mill at a speed of about 500 rpm for a duration about 10 minutes, about 1 hour, and about 3 hours. The volcanic pumice component is included in an amount of between about 10% w/w and about 30% w/w.

4 Claims, No Drawings

EFFICIENT METHODS OF GRINDING VOLCANIC PUMICE AND ITS USE IN MAKING CEMENTITIOUS COMPOSITES

BACKGROUND

Field

The disclosure of the present patent application relates to efficient grinding of volcanic pumice, thereby achieving its lowest possible particle sizes with minimum grinding efforts (low grinding time at high rpm) and then use the ground volcanic pumice as a partial substitute for traditional Portland cement.

Description of Related Art

Cement is typically made through a process that involves the following stages: mining and preparation of raw materials, clinker production, clinker and gypsum proportioning, and grinding the blend of clicker with 5% gypsum. The most common type of cement is Portland cement, and the manufacturing process for Portland cement involves the following steps: extraction of raw materials, crushing and prehomogenization, clinker production, cooling of clinker, blending and grinding of clinker (95%) and gypsum (5%), and cement storage and distribution. In the extraction of raw materials, limestone, which is quarried and extracted from deposits, has historically been the primary raw material for cement production. Other materials such as clay or shale are often mined from quarries and are usually mixed with the limestone to provide additional elements needed for the cement. The extracted raw materials are then crushed and mixed in appropriate proportions. This mixture is often referred to as raw meal. The raw meal is preheated and pre-calcined to prepare it for the next stage.

The prepared raw meal is fed into a rotary kiln, where it is heated to extremely high temperatures (about 1400-1650° C.). This process is called clinkering. In the kiln, the raw materials undergo chemical reactions, forming clinker nodules. The clinker is a sintered material resembling small marble-sized balls. The clinker is then rapidly cooled to retain its reactive properties. This is usually done using air or water. The cooled clinker is ground into a fine powder along with gypsum. A small amount of gypsum (calcium sulfate), for example, about 5% is added to control the setting time of the cement.

The final product, known as Portland cement, is stored in silos ready for distribution. It is then transported to construction sites or distribution centers in bulk or packed. This process of cement production releases carbon dioxide ($CO_2$) due to the chemical reactions involved in the conversion of raw materials into clinker. Efforts are ongoing within the industry to find more sustainable practices, such as using alternative fuels or raw materials, and improving energy efficiency to reduce the environmental impact of cement production. Utilization of alternative substitutes for Portland cement such as powdered volcanic pumice could help to reduce carbon dioxide emissions, fuel consumption, and the cost of cement production.

Thus, a cementitious composite produced from a combination of Portland cement and an alternative substitute material solving the aforementioned problems is desired.

SUMMARY OF THE INVENTION

In accordance with one embodiment, a cementitious composition is provided including a cementitious matrix containing Portland cement and a volcanic pumice component incorporated within the cementitious matrix. The volcanic pumice component is prepared by grinding in a ball mill using tungsten carbide balls.

In accordance with an embodiment, the ball mill uses a tungsten carbide bowl, for example, of 250 ml feeding capacity, and the tungsten carbide balls, for example, 12 tungsten carbide balls each having a diameter of 20 mm. In another embodiment, the volcanic pumice is prepared in the ball mill at a speed of about 500 rpm for a duration about 10 minutes, about 1 hour, and about 3 hours. The volcanic pumice is included in the cementitious composition in an amount of between about 10% w/w and about 30% w/w, particularly about 20% w/w.

A method of producing a cementitious composition is provided including grinding a quantity of volcanic pumice in a ball mill using tungsten balls; and combining the quantity of volcanic pumice with Portland cement.

These and other features of the present subject matter will become readily apparent upon further review of the following specification.

DETAILED DESCRIPTION

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, particle size ranges, or compression strength ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The cementitious composition provided by the present disclosure uses ground volcanic pumice as a partial cement substitute for traditional cement such as Portland cement. In addition to environmental benefits from reducing the production of traditional Portland cement, pumice is advantageous in applications where a lightweight aggregate is desired to replace some or all of the traditional heavier aggregates used in the production of concrete, which results in a lightweight concrete having a lower density compared to standard normal concrete.

In the development of the pumice used by the present disclosure, experiments were performed with a ball mill using a tungsten carbide bowl and tungsten carbide balls. Tungsten carbide is advantageous over other materials, such as steel, for use in grinding applications due to several key properties and characteristics such as hardness, wear resistance, heat resistance, chemical inertness, precision, reduced friction, and versatility.

Tungsten carbide (TC) is extremely hard and ranks among the hardest materials known, even harder than most types of steel. This hardness allows tungsten carbide tools to maintain their cutting edges and abrasive qualities over an extended period of use, reducing the need for frequent resharpening or replacement. TC exhibits excellent wear resistance, making it particularly suitable for abrasive grinding applications. It can withstand the abrasive forces and wear that occur during grinding processes, resulting in longer tool life and consistent performance as well as operate at higher temperatures without significant degradation when compared to steel. This heat resistance is beneficial when grinding materials that generate heat during the process, as it helps prevent tool wear and deformation. Furthermore, TC is highly resistant to chemical reactions and corrosion, can be manufactured with high precision, and exhibits lower coefficients of friction compared to steel, which can lead to smoother and more efficient grinding processes and potentially less heat generation.

Experimental Procedure

In the development of the lightweight, environmentally favorable cementitious composition disclosed herein, pumice was originally obtained from the Balochistan province in Pakistan in gravel form and then crushed to a small size (<10 mm) followed by sieving using an ASTM sieve #4. The smaller size pumice passing sieve #4 are then ground in a ball mill in the construction materials laboratory of King Faisal University, Saudi Arabia. The mill used during the experiments was a Planetary Mono Mill PULVERISETTE 6 classic line. The dimensions (W×D×H) of the mill are 37×53×50 cm. The grinding tools of the mill included a hard metal tungsten carbide grinding bowl of capacity 250 mm in combination with 12 tungsten carbide grinding balls of diameter 20 mm each. A dry grinding process was used during the experiments conducted.

At the start of the grinding experiments, the pumice was initially in the form of small size gravels passing ASTM sieve #4 (4.75 mm opening size). The grinding bowl, which forms part of the mill, was firmly locked into place after being filled with pumice. Finally, the top cover of the mill was closed, locked and the mill was operated to grind the pumice at a speed of 500 rpm and duration of about 10 minutes, about 1 hour and about 3 hours. For the present disclosure, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Results of the experiments performed to produce the pumice described herein and its use as a partial substitute of cement are set forth by the following tables.

TABLE 1

| Oxides | Chemical composition of NVP (% by weight) |
|---|---|
| $SiO_2$ | 67.06 |
| $Al_2O_3$ | 12.76 |
| $Fe_2O_3$ | 2.97 |
| CaO | 3.44 |
| MgO | 0.18 |
| $Na_2O$ | 3.07 |
| $K_2O$ | 4.82 |
| $SO_3$ | 0.29 |
| LOI | 5.41 |

Table 1 above shows the elemental composition of natural volcanic pumice (NVP). The most important finding of the above table is that the sum of the first three elements ($SiO_2+Al_2O_3+Fe_2O_3$) is 82.79% which is greater than the ASTM C 618 standard limit of 70% for materials to qualify as pozzolan for use in concrete.

TABLE 2

| Materials | Particle size | | |
|---|---|---|---|
| | $d_{10}$ | $d_{50}$ | $d_{90}$ |
| NVP (10 min) | 4.5 | 5.5 | 14.8 |
| NVP (1 h) | 15.8 | 17 | 18.3 |
| NVP (3 h) | 15.8 | 17.7 | 29.8 |

Table 2 above shows the effect of grinding duration on $d_{10}$, $d_{50}$, and $d_{90}$ sizes of NVP. Where, for NVP (10 min), $d_{10}$, $d_{50}$, and $d_{90}$ represent 10%, 50% and 90% of particles have size equal or below 4.5 microns, 5.5 microns and 14.8 microns, respectively. In general, the grinding results demonstrated that the values of these sizes increased with increasing grinding duration. A significant increase was observed when grinding duration increased from 10 minutes to 1 hour, in particular among the $d_{10}$ and $d_{50}$ sizes. However, the increase in $d_{90}$ size was relatively lower as compared to that of $d_{10}$ and $d_{50}$. With further increase of grinding duration from 1 hour to 3 hours, no change, a slight change, and a significant change in sizes were observed for $d_{10}$, $d_{50}$, and $d_{90}$, respectively.

TABLE 3

| Mix ID | Compressive strength (MPa) | | |
|---|---|---|---|
| | 7 Days | 28 Days | 91 Days |
| C100 | 50.3 | 59.5 | 66.8 |
| NVP-10% (10 min) | 53.4 | 55.2 | 67.3 |
| NVP-20% (10 min) | 48 | 62.6 | 70.4 |
| NVP-30% (10 min) | 42 | 57.2 | 61.4 |
| NVP-10% (1 h) | 51.2 | 64.2 | 65.6 |
| NVP-20% (1 h) | 49.5 | 58.4 | 62.4 |
| NVP-30% (1 h) | 47.2 | 61.4 | 57.6 |
| NVP-10% (3 h) | 48.3 | 49.2 | 57 |
| NVP-20% (3 h) | 47.9 | 54.8 | 61.1 |
| NVP-30% (3 h) | 42.1 | 53.5 | 56.8 |

Table 3 above shows the effect of grinding duration (10 min, 1 h, 3 h) and percent substitution of cement with NVP (10%, 20%, 30%) on development of compressive strength (CS) of mortar with aging (7, 28, and 91 days) and their comparison to that of a control mortar having 100% cement (C100). Despite a slightly lower CS at an early age of 7 days, it can be seen that the mortar having 20% of NVP (10 min) demonstrated higher CS at ages of 28 days and 91 days as compared to C100. The increasing grinding duration to 1 h has resulted in a slightly higher CS at 7 days and 28 days for NVP (1 h) which, however, resulted in a decreased CS at an age of 91 days when compared to C100 and corresponding mortar mixtures having similar cement substation levels of NVP (10 min). With further increase of the grinding duration to 3 h, the CS of mortar having NVP (3 h) decreased further as compared to C100 and corresponding mortar mixtures containing NVP (1 h) and NVP (10 min). Based on the comparison of results, it can be inferred that the mortar mixtures having 20% NVP (10 min) demonstrated highest CS as compared to C100 as well as all other mortars containing NVP (1 h) or NVP (3 h), irrespective of their percent substitution with cement.

TABLE 4

| Mix ID | Water Absorption (%) | Apparent Porosity (%) |
|---|---|---|
| C100 | 5.6 | 12 |
| NVP-10% (10 min) | 4.8 | 10.2 |
| NVP-20% (10 min) | 4.4 | 9.3 |
| NVP-30% (10 min) | 4.5 | 9.4 |
| NVP-10% (1 h) | 5.4 | 11.4 |
| NVP-20% (1 h) | 4.8 | 10 |
| NVP-30% (1 h) | 4.7 | 9.7 |
| NVP-10% (3 h) | 5.7 | 12 |
| NVP-20% (3 h) | 5.3 | 10.8 |
| NVP-30% (3 h) | 4.9 | 10.1 |

Table 4 above shows results of dry grinding of natural volcanic pumice (NVP) using 12 tungsten carbide balls of diameter 20 mm for durations of 10 minutes, 1 hour and 3 hours on water absorption (WA) and apparent porosity (AP). C100 represents a control mortar mixture containing 100% cement. The WA and AP for C100 were found as 5.6% and 12%, respectively. NVP-10% (10 min) represents a mortar mixture containing 90% cement and 10% natural volcanic pumice which was obtained after grinding for 10 minutes. For NVP-10% (10 min), the respective values for WA and AP were measured as 4.8% and 10.2%, respectively. The same explanation applies to other individual mortar mixtures NVP-20% (10 min) and so on. The results demonstrated that the mortar mixtures containing 10% to 30% of NVP after grinding for 10 minutes resulted in water absorption and apparent porosity values in the ranges of 4.4-4.8% and 9.3-10.2%, respectively. As compared to mortar mixtures having NVP (10 min), the mortar mixtures containing 10% to 30% of NVP after grinding for 1 h exhibited slightly higher values of WA and AP values in the ranges of 4.7-5.4% and 9.7-11.4%, respectively. With increasing grinding time to 3 h, the WA and AP values of 10% to 30% of NVP rises further to 4.9-5.7% and 10.1-12%, respectively. Based on the comparison of results, the lowest WA and AP values were observed for the mortar mixture containing NVP-20% (10 min).

It is to be understood that the cement partially replaced with ground volcanic pumice is not limited to the specific embodiments described above, but encompasses any and all embodiments within the scope of the generic language of the following claims enabled by the embodiments described herein, or otherwise described above in terms sufficient to enable one of ordinary skill in the art to make and use the claimed subject matter.

The invention claimed is:

1. A cementitious composition, comprising:
    a cementitious matrix containing Portland cement; and
    a volcanic pumice component incorporated within the cementitious matrix, wherein the volcanic pumice component is prepared by grinding in a ball mill at 500 rpm for 10 minutes using 12 tungsten carbide balls of diameter 20 mm each in a 250 ml capacity tungsten carbide bowl,
    wherein the volcanic pumice component is about 10% w/w of the cementitious composition, and
    wherein the volcanic pumice component has a $d_{10}$ particle size of about 4.5 microns, a $d_{50}$ particle size of about 5.5 microns and a $d_{90}$ particle size of about 14.8 microns, and wherein the cementitious composition has a compressive strength of 53.4 MPa after 7 days, 55.2 MPa after 28 days and 67.3 MPa after 91 days.

2. The cementitious composition as recited in claim 1, wherein the cementitious composition having the volcanic pumice component included in the amount of about 10% w/w has an apparent porosity of 10.2%.

3. A cementitious composition, comprising:

a cementitious matrix containing Portland cement; and a volcanic pumice component incorporated within the cementitious matrix, wherein the volcanic pumice component is prepared by grinding in a ball mill at 500 rpm for 10 minutes using 12 tungsten carbide balls of diameter 20 mm each in a 250 ml capacity tungsten carbide bowl, wherein the volcanic pumice component is about 20% w/w of the cementitious composition, and wherein the volcanic pumice component has a $d_{10}$ particle size of about 4.5 microns, a $d_{50}$ particle size of about 5.5 microns and a $d_{90}$ particle size of about 14.8 microns, and wherein the cementitious composition has a compressive strength of 48 MPa after 7 days, 62.6 MPa after 28 days and 70.4 MPa after 91 days.

4. The cementitious composition as recited in claim 3, wherein the cementitious composition having the volcanic pumice component included in the amount of about 20% w/w has an apparent porosity of 9.3%.

* * * * *